(12) United States Patent
Kawabata et al.

(10) Patent No.: US 8,004,723 B2
(45) Date of Patent: Aug. 23, 2011

(54) INFORMATION PROCESSING APPARATUS AND IMAGE PROCESSING APPARATUS EXECUTING SCRIPT STORED IN ASSOCIATION WITH STORAGE REGION

(75) Inventors: Hiroyuki Kawabata, Kawanishi (JP); Yoshiyuki Tamai, Itami (JP); Masami Yamada, Sennan-gun (JP); Hisashi Uchida, Kuze-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1485 days.

(21) Appl. No.: 11/362,136

(22) Filed: Feb. 27, 2006

(65) Prior Publication Data

US 2007/0112797 A1 May 17, 2007

(30) Foreign Application Priority Data

Nov. 16, 2005 (JP) .................... 2005-331348

(51) Int. Cl.
*H04N 1/00* (2006.01)
*G06F 9/44* (2006.01)
(52) U.S. Cl. ...................... 358/403; 717/115
(58) Field of Classification Search .............. 711/1–121; 717/115; 358/40
See application file for complete search history.

(56) References Cited

U.S. PATENT DOCUMENTS

| | | | | |
|---|---|---|---|---|
| 5,892,854 A * | 4/1999 | de Queiroz et al. | ........... | 382/288 |
| 6,253,217 B1 * | 6/2001 | Dourish et al. | ............... | 715/229 |
| 6,552,814 B2 * | 4/2003 | Okimoto et al. | ............. | 358/1.13 |
| 6,934,932 B2 * | 8/2005 | Dathathraya | ................. | 717/115 |
| 7,111,024 B2 * | 9/2006 | Koppich et al. | ............... | 707/203 |
| 2002/0035404 A1 * | 3/2002 | Ficco et al. | ..................... | 700/65 |

FOREIGN PATENT DOCUMENTS

| | | |
|---|---|---|
| JP | 04-148269 | 5/1992 |
| JP | 07-200477 | 8/1995 |
| JP | 08-202607 | 8/1996 |
| JP | 10-145493 A | 5/1998 |
| JP | 2001-175651 | 6/2001 |
| JP | 2002-182958 | 6/2002 |
| JP | 2004-264945 | 9/2004 |
| JP | 2005-242781 | 9/2005 |

OTHER PUBLICATIONS

Hashimoto Hirohiko (JP 08-202607) Aug. 9, 1996 English Translation.*
Chiyo Date, "Troubles any Designer Encounters without Exception and how to Overcome the Troubles, Troubles Relevant to Applications and how to Overcome the Troubles" MdN, Japan, MdN Corporation Inc., 2005, vol. 139, pp. 033 (with English Translation of relevant portion).
Final Decision for Rejection in JP 2005-331348 dated Feb. 3, 2009, and an English Translation thereof.

* cited by examiner

*Primary Examiner* — Twyler L Haskins
*Assistant Examiner* — Dennis Dicker
(74) *Attorney, Agent, or Firm* — Buchanan Ingersoll & Rooney PC

(57) ABSTRACT

An image processing apparatus formed of MFP or the like includes a plurality of folders for storing files. In the image processing apparatus, a script for the processing executed on a file stored in each folder is generated. Then, the generated script is stored in association with a folder storing a file subjected to the processing corresponding to the script in the image processing apparatus.

12 Claims, 5 Drawing Sheets

INFORMATION PROCESSING APPARATUS AND IMAGE PROCESSING APPARATUS EXECUTING SCRIPT STORED IN ASSOCIATION WITH STORAGE REGION

This application is based on Japanese Patent Application No. 2005-331348 filed with the Japan Patent Office on Nov. 16, 2005, the entire content of which is hereby incorporated by reference.

BACKGROUND OF THE INVENTION

1. Field of the Invention

The present invention relates to an information processing apparatus and an image processing apparatus, and more particularly to an information processing apparatus and an information processing method for creating a script, and an image processing apparatus and an image processing method for executing a script.

2. Description of the Related Art

Conventionally, there have been disclosed a variety of techniques for remotely controlling information equipment such as printers by operating terminals connecting to the information equipment.

For example, Japanese Laid-Open Patent Publication No. 10-145493 discloses a technique for presetting an automatically-executed program for each box in a message store-and-forward apparatus. In this message store-and-forward apparatus, when a process for retrieving or registering a message from or in the box is executed, the program set as described above is executed at a prescribed timing for the process.

However, in the conventional techniques, a program executed when a file is saved in a box is limited to only one type, and a complicated operation is required to set the program.

In other words, there may have been no conventional technique for setting an executed program flexibly according to the manner in which the users use a box.

SUMMARY OF THE INVENTION

The present invention is made in view of the aforementioned situations. An object of the present invention is to provide an information processing apparatus with a file storing unit, in which an executed program corresponding to the file storing unit can be set flexibly according to the manner in which the user uses the file storing unit.

An information processing apparatus in accordance with the present invention includes: a file storing unit having a plurality of storage regions for storing files; a script creation unit creating a script for processing executed on a file stored in the storage region; and a script storage unit storing the script created by the script creation unit in association with the storage region in which a file subjected to the processing is stored.

An image processing apparatus in accordance with the present invention includes: a designation unit designating a storage region for storing a file; a display unit displaying information specifying a plurality of scripts associated with the storage region designated by the designation unit; a selection unit selecting information corresponding to a script to be executed from the information displayed at the display unit; and an output unit outputting the file to be saved in the storage region designated by the designation unit and also outputting an instruction to execute the script corresponding to the information selected by the selection unit for the file.

An information processing method in accordance with the present invention includes: a determination step of determining whether or not prescribed processing is executed on a file stored in a prescribed storage region in a file storing unit; a creation step of creating a script for the prescribed processing when it is determined that the prescribed processing is executed at the determination step; and a script storage step of storing the script created at the creation step in association with the prescribed storage region.

An image processing method in accordance with the present invention includes: a designation step of designating a storage region for storing a file; a display step of displaying a plurality of scripts associated with the designated storage region; a selection step of selecting a script to be executed among a plurality of displayed scripts; and an output step of outputting the file to be saved in the designated storage region and also outputting an instruction to execute the selected script for the file.

In accordance with the present invention, when a file is stored in the information processing apparatus and processing is then executed on the file, a script for the processing executed on the file is created. The created script is then stored in association with a storage location for the file.

Therefore, the script stored in association with the file storage location is assumed as a script for the processing actually executed on the file stored in the storage location.

Accordingly, in the information processing apparatus, a program corresponding to the manner of actual usage of the file storing region is stored in relation with the file storage location.

In another respect, in accordance with the present invention, when a file is to be stored, a plurality of scripts associated with the file storing location are displayed, so that a script to be executed is selected thereamong. Therefore, it becomes possible to execute a script as intended by the user with a simple operation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
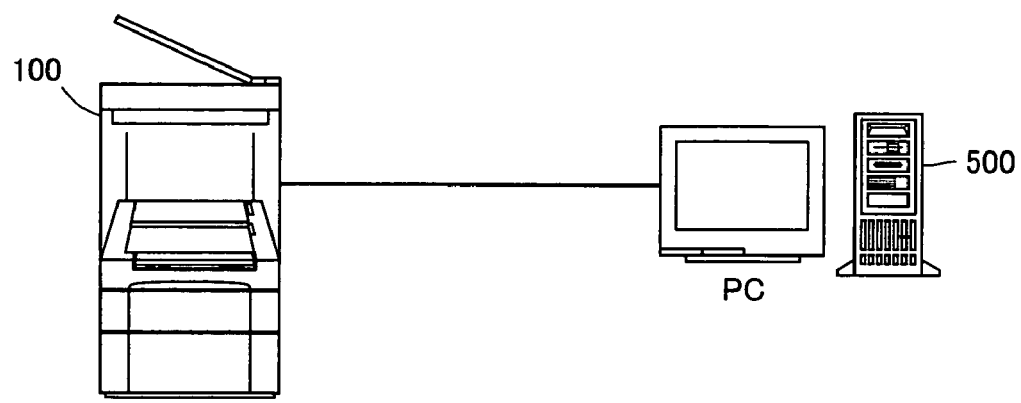
FIG. 1 is a diagram schematically showing a configuration of an information processing system in one embodiment in accordance with the present invention.

First, referring to FIG. 1, an embodiment of an information processing system in accordance with the present invention will be described.

The information processing system includes an image processing apparatus 100 formed of, for example, MFP (Multi Function Peripherals), and an information processing terminal 500 transmitting a file to request the image processing apparatus to execute a printing process and the like. It is noted that the number of terminals (apparatuses) included in the information processing system is not limited to the one shown in FIG. 1.

Figure 2:
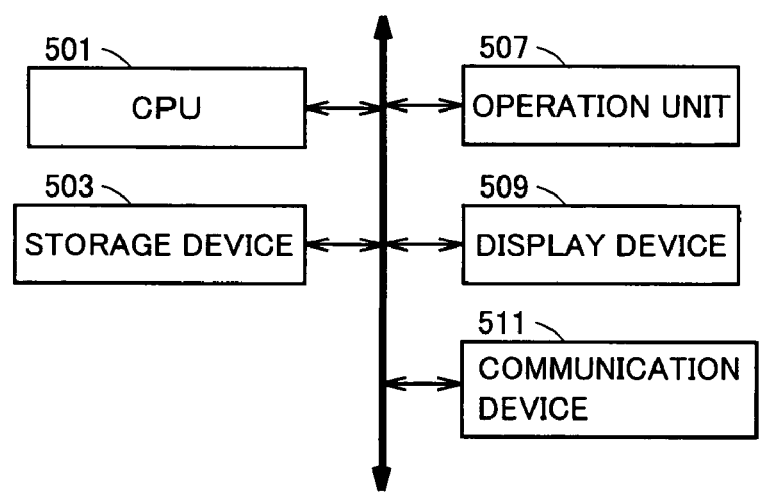
FIG. 2 is a control block diagram of an information processing terminal in FIG. 1.

Referring to FIG. 2, information processing terminal 500 includes a CPU (Central Processing Unit) 501 controlling the entire terminal, a storage device 503 storing information, an operation unit 507 receiving an input of an operation from the user, a display device 509 displaying information, and a communication device 511 for information communications with other apparatuses.

Figure 3:
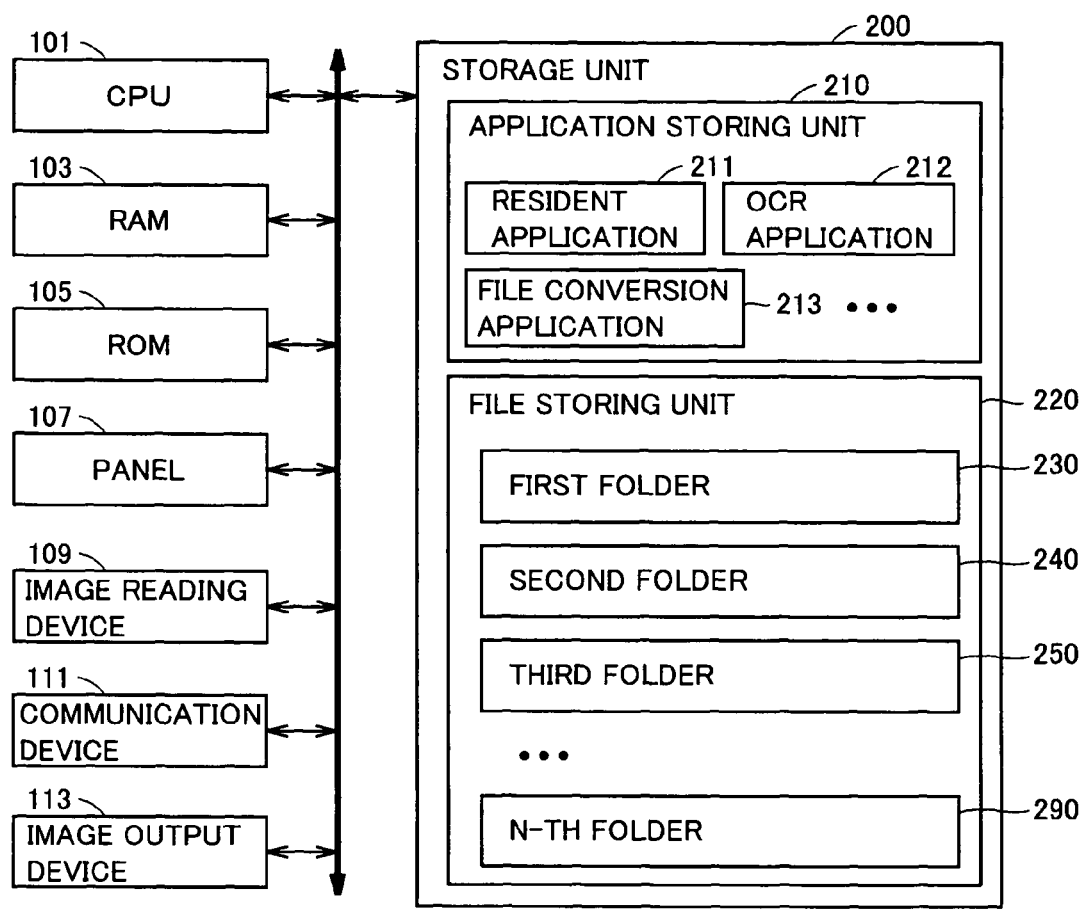
FIG. 3 is a control block diagram of an image processing apparatus in FIG. 1.

Referring to FIG. 3, image processing apparatus 100 includes a CPU 101 controlling the entire apparatus, an RAM (Random Access Memory) 103 temporarily storing data, an ROM (Read Only Memory) 105 storing programs, constants, and the like, a panel 107 displaying information, an image reading device 109 reading an image of a document in a prescribed read mode, a communication device 111 for information communications with other apparatuses, an image output device 113 such as a printer, and a storage unit 200 storing a variety of information. It is noted that panel 107 and image reading device 109 may be formed of a liquid crystal display and a touch panel placed thereon.

Storage unit 200 includes an application storing unit 210 for storing a program of an application executed in image processing apparatus 100, and a file storing unit 220 for storing data such as files.

Application storing unit 210 stores a plurality of application programs (also referred to as an application hereinafter). In the figure, application storing unit 210 includes, in addition to a resident application 211 as described later, a character recognition (OCR: Optical Character Reader) application for recognizing a character image into a character code, and a file conversion application 213 converting a file format. In addition, a variety of image processing applications for processing files (image data) may be stored, such as a color conversion application for color conversion, a resolution conversion application for converting a resolution of a file, and a masking/trimming application for trimming or masking an image.

File storing unit 220 has a plurality of folders such as a first folder 230, a second folder 240, . . . , and the N-th folder 290. Each folder is a storage region in which a file is stored. It is noted that a file read by image reading device 109, a file transmitted from another image processing apparatus (not-shown), or a file created in and transmitted from information processing terminal 500 is stored in a specified folder.

Figure 4:
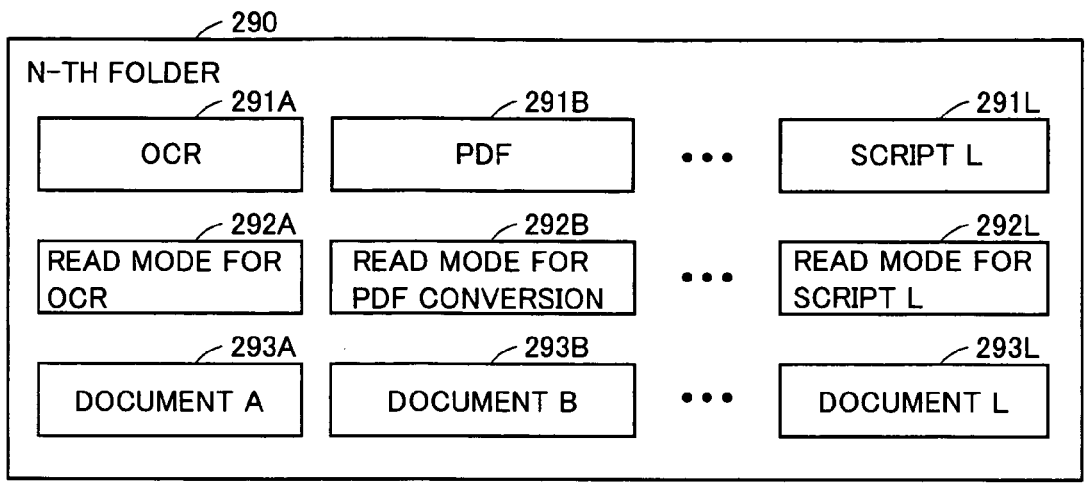
FIG. 4 is a diagram schematically showing a manner of storing information in the N-th folder in FIG. 1.

FIG. 4 is a diagram schematically showing a storage manner in the N-th folder 290 in file storing unit 220 as described above. Document A293A-document X293X are stored as files in the N-th folder 290. These files include a file read by image reading device 109, a file transmitted from not-shown another image processing apparatus, or a file created in and transmitted from information processing terminal 500, and may be a file copied from any other folder such as the first folder 230 as a matter of course. In any case, these files are specified to be saved in the N-th folder 290 and then stored.

Furthermore, in the present embodiment, an OCR script A291A, a PDF conversion script 291B, . . . , a script 291L for script L are stored in the N-th folder 290. Although these OCR script A291A to script L291L are stored in the N-th folder 290 in the present embodiment, they may be stored in a region different from the N-th folder 290, a storage unit different from the file storing unit, or an apparatus other than image processing apparatus 100, as long as they are associated with the N-th folder 290. In any case, the script storing unit for storing OCR script A291A-script L291L is associated with the N-th folder 290. In the present embodiment, the script storing unit and the file storing unit are stored in the same storage region (the N-th folder 290) only by way of illustration.

Here, "script" is a kind of a program for automating a complicated operation procedure in a computer, an information processing apparatus, or application software and is created by describing the operation procedures using a syntax of a script language for automatic control of execution of computers, information processing apparatuses, application software, or tools, or for automating the process procedures for data editing or processing of files or databases (processing such as file format conversion, character recognition, color conversion, resolution conversion, masking, or trimming). In the present embodiment, the script allows automatic processing for the files using a variety of applications stored in application storing unit 210, or automatic execution of a variety of functions of the information processing apparatus (the processing such as file transfer (transmission), file copy, or printing). The creation of scripts will be described later.

In the present embodiment, a read mode is also stored in the N-th folder 290. In FIG. 4, a read mode 292A for OCR, a read mode 292B for PDF conversion, and a read mode 292L for script L are stored. In these stored read modes, read conditions for optimizing the processing by a script when the script is executed on a file read by image reading apparatus 109 are stored. For example, in the case of a script for OCR processing, the read mode of image reading device 109 is preferably set in such a manner as to eliminate a background, reduce a JPEG compression rate for sharpening character edges, and make a resolution high such as 600 dpi. Therefore, these settings are stored as read mode 292 for OCR script. In another example, in the case of a script for the processing of reducing an image to be transferred to another device (Web server), the read mode for this script is stored. Therefore, read mode 292 is stored in association with a script. Of course, if a script is not affected by a read mode, a read mode needs not be stored corresponding to the script. It is noted that although in the present embodiment a region for storing read mode 292 (a read mode storing unit) is shared with the file storing unit and the folders storing scripts, the read modes may be stored in a storage unit different from the file storing unit or an apparatus other than image processing apparatus 100 as long as they are associated with scripts.

Here, the process of creating a script in image processing apparatus 100 will be described with reference to the flowchart for this process in FIG. 5. In the present embodiment, a script is created by resident application 211 stored in application storing unit 210.

Resident application 211 always watches whether or not processing is performed on the file stored in each of folders 230, 240, . . . , 290 (step SA1). When it is determined that processing is performed on a file, a script related to the processing is created (step SA2). The created script is associated with the folder storing the file subjected to the processing and is then stored in the same folder in the present embodiment (step SA3). Specifically, when a user uses OCR application 212 to execute the OCR processing on a file named document A298A stored in a certain box (here, the N-th folder 290) on image processing apparatus 100 or information processing terminal 500, resident application 211 creates a script for this OCR processing automatically (with the condition of execution of the OCR processing) and stores the created script in the N-th folder 290. Here, the conditions of the OCR processing and the like are also recorded in the script. Alternatively, in another example, when a print process of printing-out from image output device 113 is executed on a file named a document B293B stored in a certain box (here, the N-th folder 290) on image processing apparatus 100 or information processing terminal 500, resident application 211 automatically creates a script for this print process and stores the created script in the N-th folder 290. Of course, the mode set during the print-out (single-sided/double-sided, color/monochrome, staple/nonstaple, and the like) is also stored as a part of the script.

Figure 5:
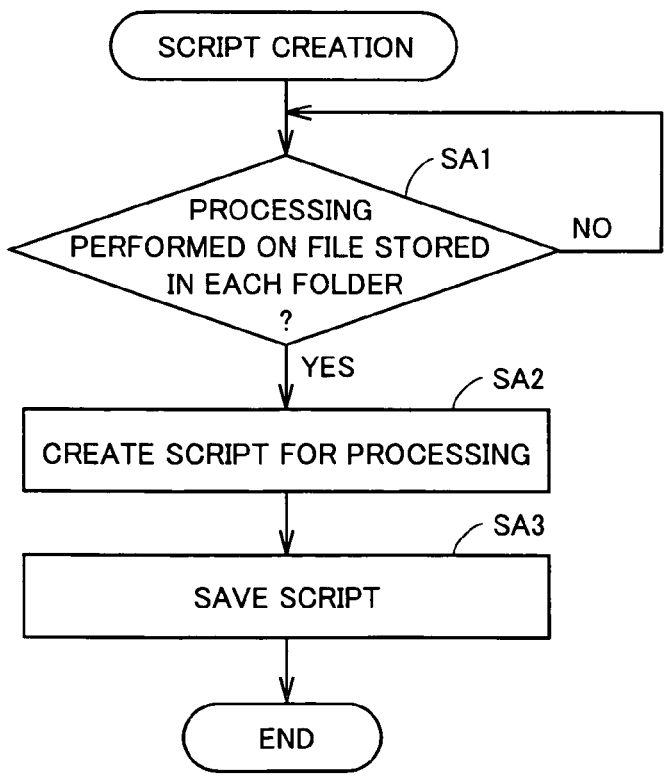
FIG. 5 is a flowchart of the process executed in creation of a script in the image processing apparatus in FIG. 1.

On the other hand, as for read mode 292, when the user saves a file read by image reading device 109 in a prescribed folder and also executes prescribed processing, a script for the prescribed processing is created and stored as in FIG. 5 described above, and the read mode here is stored in association with the stored script. In this way, read mode 292 is stored automatically (without the need for any operation of the user). Instead, a read mode suitable for the script that has once been created may be stored in association with the script on panel 107 of image processing apparatus 100 or information processing terminal 500.

The process of saving a file in a prescribed folder in image processing apparatus 100 will now be described with reference to the flowchart for this process in FIG. 6. This process corresponds to a program executed by CPU 101.

First, at step SB1, CPU 101 receives from CPU 501 of information processing terminal 500 a designation of which of the first folder to the N-th folder in file storing unit 220 is a destination of transmission (saving) of a file read by image reading device 109.

Then, at step SB2, CPU 101 obtains a script associated with the destination designated at step SB1 (any of the first to the N-th folders). Obtained actually is not a script itself but a script name stored in associated with the script during saving of the script, a script name stored in association with the saved script, or a script name automatically assigned to the saved script. For example, if the designated destination is the N-th folder 290 shown in FIG. 4, the script for the designated destination is script A-script X in FIG. 4. Then, at step SB3, CPU 101 displays a list of scripts stored in association with the destination stored at step SB2 on panel 107. An example of display of such scripts is shown in FIG. 7.

Figure 7:
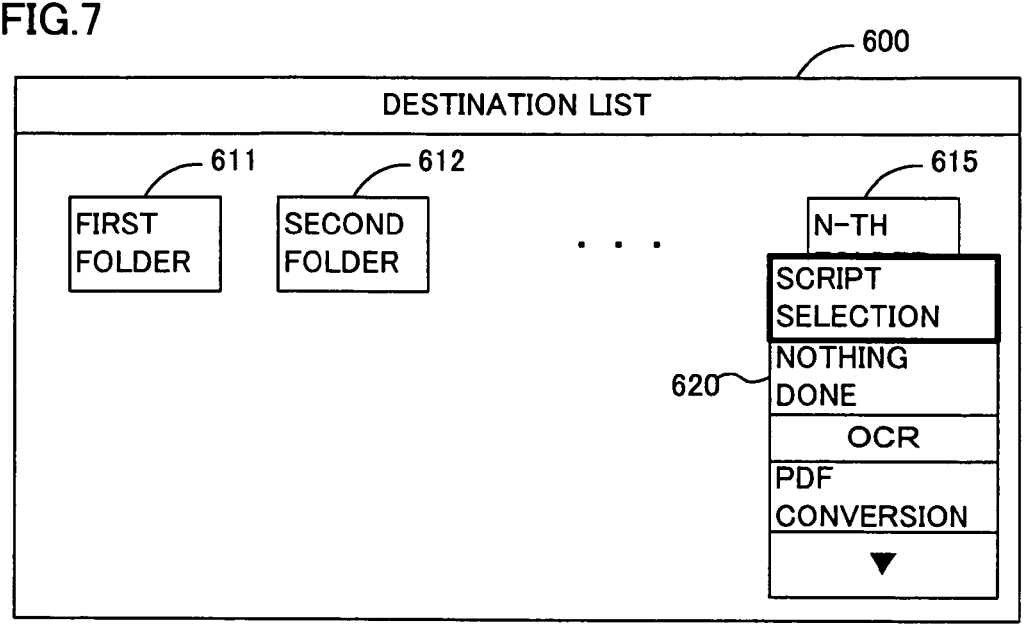
FIG. 7 is a diagram showing an exemplary window displayed on a panel of the image processing apparatus in FIG. 1.

In FIG. 7, icons 611-615 corresponding to folders 230-290 in file storing unit 220 are displayed on a window 600 on panel 107. Then, when a destination is designated at step SB1, a list of scripts stored in association with this destination is displayed. In FIG. 7, when icon 615 corresponding to the N-th folder 290 is designated (a press on a touch panel) as a destination at SB1, scripts 291A-291L stored in association with the N-th folder 290 are obtained, and a list display field 620 is popped up in the vicinity of icon 615 of the N-th folder 290, as shown in FIG. 7. More specifically, scripts "OCR" and "PDF conversion" stored in association with the N-th folder 290 designated as a destination are displayed in list display field 620 and the other scripts can be displayed by selecting the downward arrow portion, so that a script is selected thereamong. It is noted that in FIG. 7, a choice "nothing done" is provided in order to only save a file without executing any scripts. It is noted that the script names as described above are displayed here.

Returning to FIG. 6, after the list display at step SB8, at step SB4, CPU 101 determines whether or not a prescribed script is designated among a plurality of scripts displayed in a list. This determination can be made as follows: for example, when the user presses a not-shown OK button or copy button while selecting a prescribed script on a pop-up window appearing on window 600 as shown in FIG. 7, it is determined whether or not the displayed script is selected.

Then, if no script (nothing done) is designated, at step SB1, CPU 101 drives image reading device 109 in the presently-set read mode to read an image of a document and saves the read image as a file into a destination (folder) designated at SB1. The process then ends.

On the other hand, if it is determined that any script is designated, at step SB5, CPU 101 determines whether or not a read mode is stored in association with the script designated at step SB4. If stored, CPU 101 reads the read mode and changes the read mode of image reading device 109 to this read mode, at step SB6. On the other hand, if not stored, CPU 101 sets the presently-set read mode as a read mode as it is.

Then, at step SB7, CPU 101 drives image reading device 109 in the set read mode to read an image of a document and saves the read image as a file in a destination (folder) designated at step SB1.

At step SB8, CPU 101 watches whether or not the file is saved in the designated destination. When the saving is confirmed (step SB8), an instruction to execute the script designated at step SB4 is issued (step SB9). Based on this instruction to execute the script, CPU 101 executes the script (step SB10). In the execution of the script, the processing described in the script is executed by CPU 101 itself, by driving a necessary application, or by using any other device or function held by image processing apparatus 100, such as communication device 111 or image output device 113.

Figure 6:
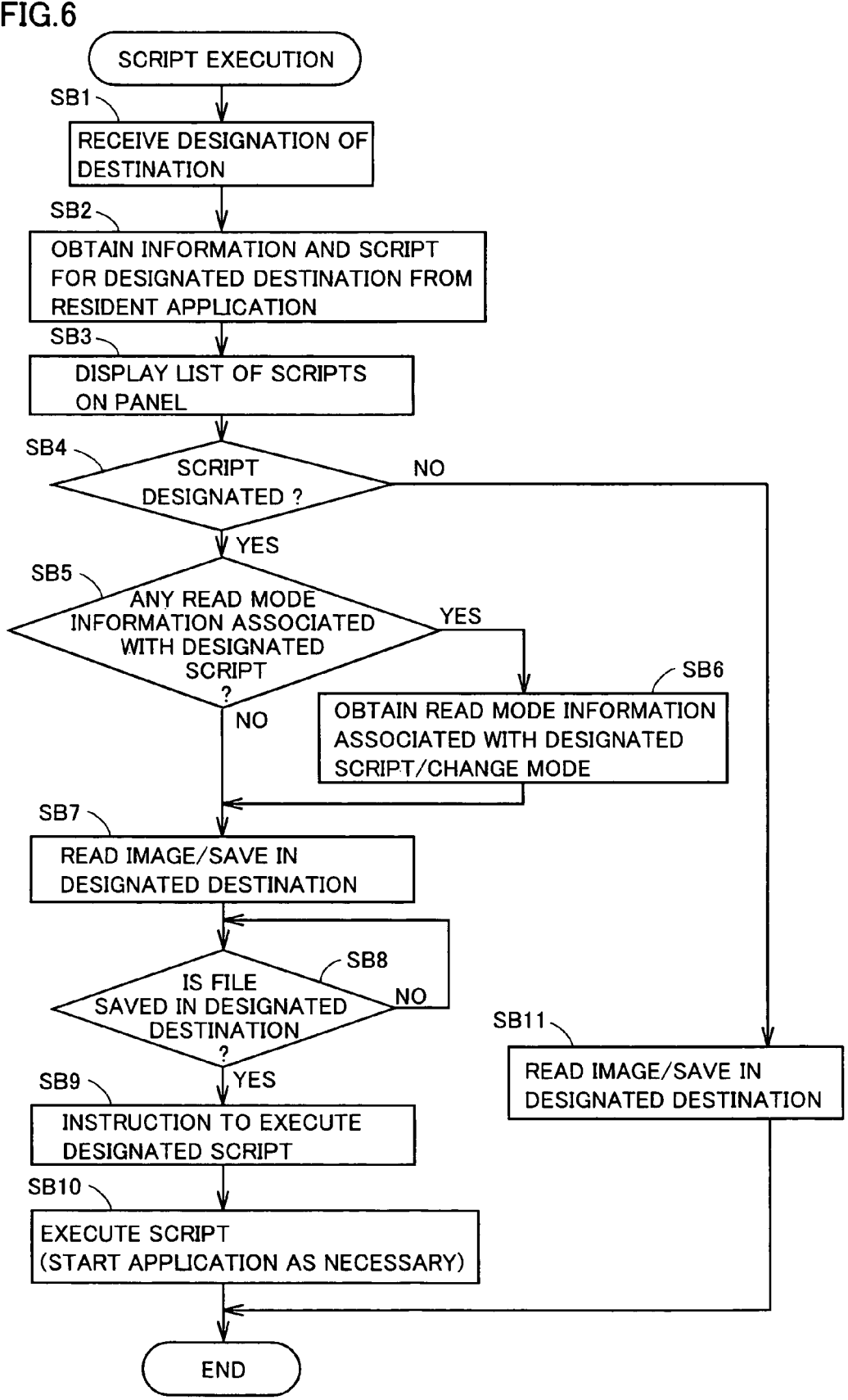
FIG. 6 is a flowchart of the process executed in execution of a script in the image processing apparatus in FIG. 1.

Although the processing is performed on a file input from image reading device 109 in the foregoing description with reference to FIG. 6, the processing may be performed similarly on a file that is stored in another apparatus and is then saved in a designated destination by communication device 111. In this case, since the file has already been saved in another apparatus, step SB5 and step SB6 are skipped without image reading, and the image reading at step SB7 or step SB10 is replaced with the image obtaining from another apparatus. The files saved in information processing terminal 500 can be designated on the side of information processing terminal 500 itself. Specifically, in this case, step SB1-step SB4 (step SB5 or step SB6 is skipped as a matter of course) are executed by CPU 501 on the information processing terminal 500 side. Thereafter, information of the file, the designated destination, and the selected script is transmitted from information processing terminal 500 to image processing apparatus 100, so that step SB7-step SB12 are executed by CPU 101 on the image processing apparatus 100 side. Of course, on the contrary, with a destination of a storage device of another apparatus, the scripts associated with that destination (and also read mode information) may be obtained and displayed for selection, and the read mode may be changed (when a file read by image reading device 109 is saved) on the image processing apparatus 100 side. Then, the file, the selected script, and the designated destination may be transmitted to another apparatus (step SB1-step SB6 are performed by CPU 101 on the image processing apparatus 100 side). On the side of another apparatus, the received file may be saved in the received designated destination, and the selected script may be executed upon confirmation of the saving. In short, in this case, the processes corresponding to step SB7-step SB12 are executed by CPU on the side of another apparatus.

Although the listed destinations are folders 230-290 in file storing unit 220 in image processing apparatus 100 in this embodiment, the present invention is not limited thereto. Alternatively, as described above, the destination may be a storage device in another apparatus (in this case, it may be set depending on a transmission scheme such as SMB (Server Message Block) or FTP), or may be registered beforehand in image processing apparatus 100, such as a program transmission BOX for storing a file transmitted at a prescribed time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus comprising:
    a file storing unit having a plurality of storage regions for storing files;
    a determination unit configured to determine if a process is executed on a file stored in each of the storage regions;
    a script creation unit configured to create, when the determination unit determines that a process is executed on a file stored in a particular storage region from the plurality of storage regions, a script related to the executed process;
    a script storage unit configured to store said script created by said script creation unit in association with the particular storage region from the plurality of storage regions; and
    a script execution unit configured to execute, when a new file is stored in the particular storage region, the script stored in the script storage unit in association with the particular storage region for the new file.

2. The information processing apparatus according to claim 1, wherein when the script stored in the script storage unit is not executed by the script execution unit for a prescribed period of time, the script storage unit deletes storage of the script.

3. The information processing apparatus according to claim 1, further comprising:
    a designation unit configured to receive a designation of the particular storage region for storing the new file;
    a display unit displaying a plurality of scripts stored in the script storage unit in association with the particular storage region designated by the designation unit; and
    a selection unit configured to receive a selection of script to be executed among the plurality of scripts displayed at the display unit, wherein when the new file is stored in the particular storage region designated by the designation unit, the script execution unit executes the script selected by the selection unit for the new file.

4. The information processing apparatus according to claim 3, further comprising:
    a reading unit configured to read an image of a document in a prescribed read mode and to create a file which is to be stored in the particular storage region;
    a read mode storing unit configured to store, when said determination unit determines that the process is executed on the file created by the reading unit, the read mode in association with the script created by the script creation unit; and
    a reading control unit configured to control the reading unit such that the image of the document is read in the read mode stored in association with the script selected by the selection unit.

5. The information processing apparatus according to claim 1, wherein the script is a script for processing of file transfer, file copy, or file printing.

6. The information processing apparatus according to claim 1, wherein the script is a script for processing of file format conversion, character recognition, color conversion, resolution conversion, masking, or trimming.

7. An information processing method executed by an information processing apparatus including a file storing unit having a plurality of storage regions for storing files, the method comprising the steps of:
    determining, in the information processing apparatus, whether or not a prescribed process is executed on a file stored in each of the storage regions;
    creating, in the information processing apparatus, when it is determined that the prescribed process is executed on a file stored in a particular storage region from the plurality of storage regions at the determining step, a script related to the executed process;
    storing, in the information processing apparatus, the script created at the creating step in association with the particular storage region from the plurality of storage regions; and
    executing, in the information processing apparatus, when a new file is stored in the particular storage region, the script stored in the script storage unit in association with the particular storage region for the new file.

8. The information processing method according to claim 7, further comprising the steps of:
    receiving, in the information processing apparatus, a designation of the particular storage region for storing the new file;
    displaying, on a display device, a plurality of scripts associated with the particular storage region designated at the designation receiving step; and
    receiving, in the information processing apparatus, a selection of a script to be executed among the plurality of scripts displayed at the displaying step, wherein
    when the new file is stored in the particular storage region designated at the designation receiving step, the script execution step executes the script selected at the selection receiving step for the new file.

9. The information processing method according to claim 8, wherein the information processing apparatus further includes a reading unit configured to read an image of a document in a prescribed read mode and to create a file which is to be stored in the particular storage region, further comprising the steps of:
    storing, in the information processing apparatus, when it is determined that the prescribed processing is executed on the file created by the reading unit at the determining step, the read mode in association with the script created at the creating step; and
    controlling, in the information processing apparatus, the reading unit such that the image of the document is read in the read mode stored in association with the script selected at the selection receiving step.

10. The information processing method according to claim 7, further comprising the step of:
    deleting, when the script stored at the script storage step is not executed at the script execution step for a prescribed period of time, the stored script.

11. The information processing method according to claim 7, wherein the script is a script for processing of file transfer, file copy, or file printing.

12. The information processing method according to claim 7, wherein the script is a script for processing of file format conversion, character recognition, color conversion, resolution conversion, masking, or trimming.

* * * * *